US011182761B2

(12) United States Patent
Karro et al.

(10) Patent No.: US 11,182,761 B2
(45) Date of Patent: Nov. 23, 2021

(54) INFORMATION TECHNOLOGY EQUIPMENT REPLACEMENT CALCULATION SYSTEMS AND METHODS

(71) Applicant: Walmart Apollo, LLC, Bentonville, AR (US)

(72) Inventors: Dennis Karro, Bentonville, AR (US); Rob Mahler, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 683 days.

(21) Appl. No.: 15/910,490

(22) Filed: Mar. 2, 2018

(65) Prior Publication Data

US 2018/0253709 A1 Sep. 6, 2018

Related U.S. Application Data

(60) Provisional application No. 62/466,704, filed on Mar. 3, 2017.

(51) Int. Cl.
*G06Q 10/00* (2012.01)
*G06Q 20/20* (2012.01)
*G06F 16/18* (2019.01)
*G06Q 20/00* (2012.01)

(52) U.S. Cl.
CPC ....... *G06Q 20/202* (2013.01); *G06F 16/1865* (2019.01); *G06Q 10/20* (2013.01); *G06Q 20/00* (2013.01)

(58) Field of Classification Search
CPC .... G06Q 10/06; G06Q 10/087; G06Q 10/063; G06Q 40/00; G06Q 10/0635; G06Q 10/20; G06Q 20/202
See application file for complete search history.

(56) References Cited

U.S. PATENT DOCUMENTS

| | | | | |
|---|---|---|---|---|
| 5,844,808 A | * | 12/1998 | Konsmo | G07F 5/18 700/244 |
| 6,532,435 B1 | * | 3/2003 | Aoshika | G06Q 20/10 370/254 |
| 6,952,680 B1 | | 10/2005 | Melby | |
| 6,999,829 B2 | | 2/2006 | Bazzocchi | |
| 7,232,063 B2 | * | 6/2007 | Fandel | G06Q 20/20 235/376 |
| 7,600,671 B2 | * | 10/2009 | Forrest | G07F 9/026 235/376 |
| 7,716,077 B1 | | 5/2010 | Mikurak | |

(Continued)

*Primary Examiner* — Florian M Zeender
*Assistant Examiner* — Milena Racic
(74) *Attorney, Agent, or Firm* — Patterson Thuente Pedersen, P.A.

(57) ABSTRACT

Embodiments relate to systems and methods for assessing site-wide IT and other electronic equipment replacement criticality. A system generally includes a plurality of point-of-sale (POS) systems located at a corresponding plurality of retail sites, a centralized transaction database configured to receive datasets from each of the plurality of POS systems, a processor configured to group the plurality of retail sites according a predefined site type, determine averages for each field within the received datasets, compare the received datasets to the computed averages, multiply the comparisons by a weighting value, and at the weighted comparisons together to form a criticality score.

20 Claims, 4 Drawing Sheets

(56) References Cited

U.S. PATENT DOCUMENTS

| | | | |
|---|---|---|---|
| 7,853,729 B2* | 12/2010 | Park | G06F 11/006 |
| | | | 710/15 |
| 8,746,551 B2* | 6/2014 | Bryant | G06F 11/008 |
| | | | 235/379 |
| 8,965,781 B2* | 2/2015 | Urquhart | D06F 33/00 |
| | | | 705/13 |
| 8,983,862 B2* | 3/2015 | Canada | G06F 11/0748 |
| | | | 705/16 |
| 10,699,265 B2* | 6/2020 | Urquhart | G06Q 20/4037 |
| 2003/0028393 A1 | 2/2003 | Coulston | |
| 2003/0069782 A1 | 4/2003 | Chrisman | |
| 2004/0049427 A1* | 3/2004 | Tami | G06Q 20/209 |
| | | | 705/24 |
| 2005/0108326 A1* | 5/2005 | Tuttle | D06F 95/00 |
| | | | 709/203 |
| 2007/0239569 A1 | 7/2007 | Lucas | |
| 2012/0059684 A1 | 3/2012 | Hampapur | |
| 2012/0166249 A1 | 6/2012 | Jackson | |

\* cited by examiner

INFORMATION TECHNOLOGY EQUIPMENT REPLACEMENT CALCULATION SYSTEMS AND METHODS

CROSS-REFERENCE TO RELATED APPLICATION

The present application claims the benefit of U.S. Provisional Application No. 62/466,704 filed Mar. 3, 2017, which is hereby incorporated herein in its entirety by reference.

TECHNICAL FIELD

Embodiments of the present disclosure relate generally to an information technology equipment replacement calculation system and method. More particularly, embodiments of the present disclosure relate to identifying and prioritizing retail stores that warrant upgrade or replacement of on-site information technology equipment.

BACKGROUND

Many retail businesses operate a plurality of information technology (IT) assets to assist in the performance of daily business activities. For example, a typical retailer can employ IT assets, such as a point-of-sale (POS) system involving cash registers, scanners, and computers, and other electronic equipment. Traditionally, businesses have purchased these assets for use in their facilities and have employed staff to operate and maintain these assets in furtherance of the operation of their business.

The operation of these IT assets is usually considered to be somewhat ancillary to the retailer's core business. In other words, although the use of these IT assets is helpful to the retailer in order to conduct its business in a cost-efficient manner, the ownership, operation, and maintenance of such IT assets is not, of itself, a core function of the business. Consequently, the costs associated with the procurement and utilization of such IT assets has not been traditionally monitored or analyzed by the business in great detail. Rather, such costs have usually been considered to be relatively fixed costs of doing business. Moreover, many decisions regarding the replacement and/or upgrade of these assets are based on anecdotal evidence, such as the number of maintenance work orders placed on individual IT assets, an employee's perception of certain IT assets, and other subjective opinions.

To date, many retailers have been able to conduct their business without actively managing the costs of obtaining an operating these IT assets. However, maximizing efficient use and minimizing the costs of procuring, replacing and maintaining such equipment are key considerations in the modern competitive business environment. Thus, it would be desirable to provide a system and method for automatically gathering, analyzing, and delivering information relating to actual IT asset usage and status, rather than subjective employee opinions, so as to maximize efficient use of such assets, and to reduce operating costs and administrative burdens associated with such IT assets.

SUMMARY

Embodiments of the present disclosure relate to systems and methods for identifying and prioritizing sites that warrant upgrade and/or replacement of on-site information technology (IT) equipment that rely only on objective data, rather than subjective opinions. Moreover, embodiments of the present disclosure enable proactive, predictive analysis of potentially large volumes of actual retail environment data in real time to determine IT equipment needs.

Instead of relying on subjective employee opinions for the identification and prioritization IT equipment replacement, as is done in conventional systems, embodiments of the present disclosure utilize only objective data from actual stores. Such data can include, for example, the age of the equipment, the frequency and/or extent of IT past repairs, the amount of usage of the equipment, the sales revenue generated by the equipment, the location of the site, and information regarding local competitors. The sites can be, for example, specific stores or business centers within a retail store chain or network.

Collected usage data for a given retail site can be combined with usage data from other sites across a retail network to compute network averages for each aspect of actual usage data. A criticality score for each retail site can be computed as a function of actual usage data collected from the retail site, the network averages for each aspect of actual usage data, and a weighting factor for each aspect of actual usage data. Thereafter, a comparison of the criticality scores computed for each of the various retail sites to a series of predefined thresholds can enable each of the retail sites to be identified and prioritized within the retail network according to their IT needs.

In one embodiment, the present disclosure provides a system for assessing site-wide equipment replacement criticality that comprises, at each of a plurality of sites, a point-of-sale (POS) system having a years in service number and configured to accumulate transaction data, the transaction data comprising an item rate of a number of items in each transaction processed by the POS system, a total number of transactions processed by the POS system, one or more diagnostic alerts generated by the POS system, a site revenue value, and; a transaction database configured to receive the years in service number and the transaction data comprising the item rate, the total number of transactions, and the site revenue value from the POS system at each of the plurality of sites; a processor configured to: for each of the plurality of sites, compute a lane usage as a product of the item rate and the total number of transactions and store the computed lane usages as part of the transaction data in the transaction database, group the plurality of sites into a plurality of site types, for each site type, determine a set of averages comprising an average years in service number, an average item rate, an average lane usage, an average total number of transactions, and an average store revenue value from data in the transaction database, for each site, compare the years in service number and the transaction data from the site with the set of averages for the site type of the site, for each site, perform a weighting of the result of the comparing, and for each site, determine a site-based criticality score from the weighting of the result of the comparing; and a user interface communicatively coupled with the processor and configured to present the site-based criticality score for each site.

Another embodiment of the present disclosure provides a method of assessing site-wide equipment replacement criticality comprising: grouping a plurality of retail sites into a plurality of site types; for each of the plurality of retail sites: obtaining a point-of-sale (POS) system years in service number and transaction data, the transaction data comprising an item rate of a number of items in each transaction processed by the POS system, a total number of transactions processed by the POS system, and a site revenue value, and computing a lane usage as a product of the item rate and the total number of transactions and including the computed lane usage with the transaction data; for each site type, determining a set of averages comprising an average years in service number, an average item rate, an average lane usage, an average total number of transactions, and an average site revenue value; comparing the years in service number and the transaction data from each site with the set of averages for the site type of the site; performing a weighting of the result of the comparing; and determining a site-based criticality score for each site from the weighting of the result of the comparing.

Embodiments of the present disclosure further include a service scheduler communicatively coupled with the processor and configured to create one or more service request records for each site having a site-based criticality score above a threshold, each service request record indicating a maintenance action to be performed on at least one POS system at the site, and transmit each service request record to a computing device for review by a user.

The above summary is not intended to describe each illustrated embodiment or every implementation of the subject matter hereof. The figures and detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
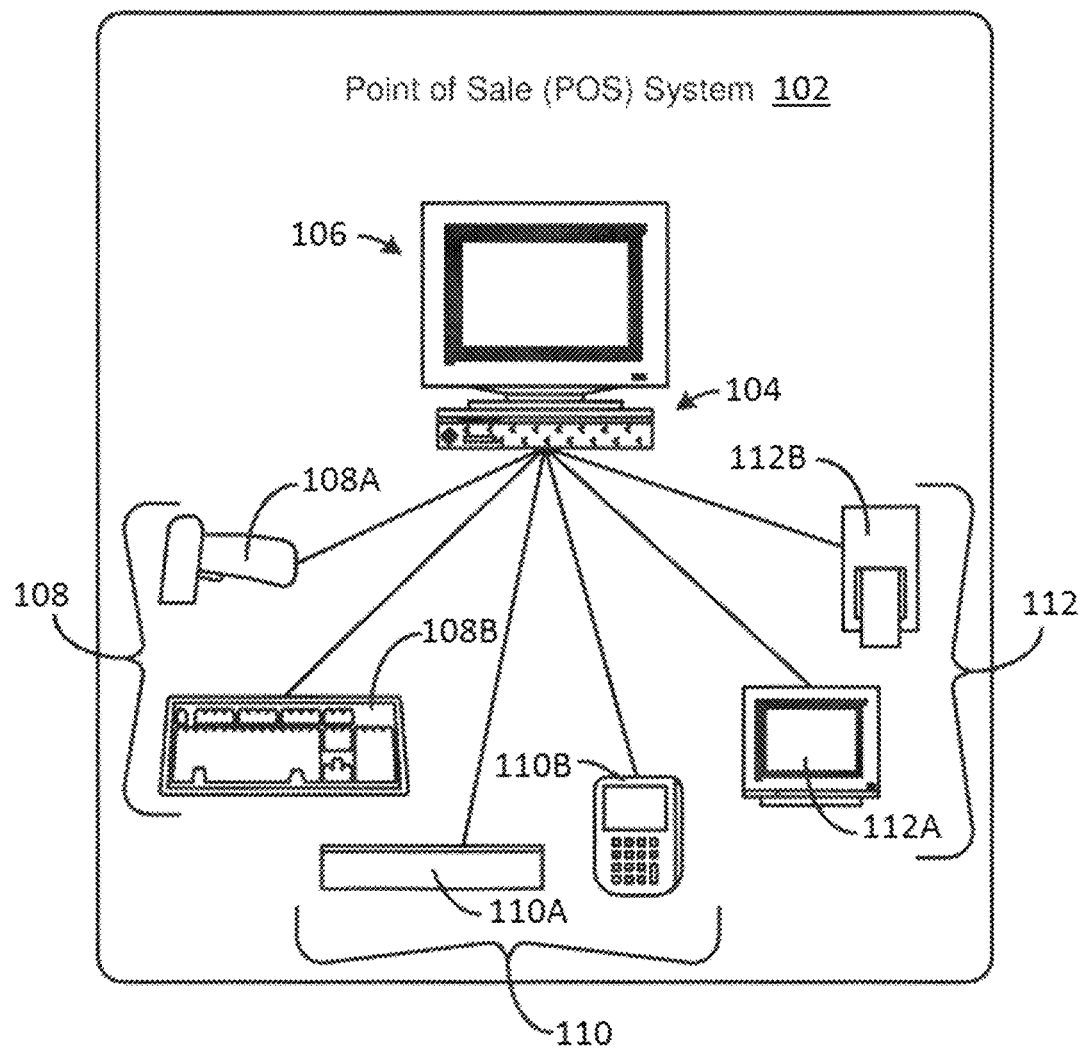
FIG. 1 is a schematic block diagram depicting a POS system in accordance with an embodiment of the disclosure.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION OF THE DRAWINGS

Referring to FIG. 1, a schematic block diagram of a POS system 102 is depicted in accordance with an embodiment of the disclosure. The POS system 102 can include various components. In one embodiment, the POS system 102 can include a central or primary computer 104, a monitor 106 (e.g., a cashier facing monitor 106), one or more input devices 108 (e.g., scanners 108A, keyboards 108B, scales, or the like), one or more payment devices 110 (e.g., cash drawers 110A, card readers 110B) for receiving or returning payments, one or more output devices 112 (e.g., customer facing display 112A or monitor 112A, receipt printer 112B) or combinations thereof. Other embodiments of POS systems 102 can include communications equipment, servers, network infrastructure, switches, handheld devices, and the like.

The primary computer 104 can form the primary processing unit of the POS system 102. Other components 106, 108, 110, and 112 can communicate with the primary computer 104. Input devices 108 and certain payment devices 110 can feed data and commands to the primary computer 104 for processing or implementation. For example, a scanner 108A can pass data communicating the identity of one or more items to be purchased, returned, or the like to the primary computer 104. Similarly, a card reader 110B can pass payment information to the primary computer 104.

Conversely, output devices 112 and certain payment devices 110 can follow or implement commands issued by the primary computer 104. For example, a cash drawer 110A can open in accordance with commands from the primary computer 104. Similarly, a customer facing display 112A and receipt printer 112B can display or output data or information as instructed by the primary computer 104.

In addition to handling customer transactions (e.g., purchases and returns), the POS system 102 can also provide or support certain "back-office" functionality in some embodiments, though in other embodiments other computers or systems separate from POS system 102 can support this functionality. For example, the POS system 102 can provide or support inventory control, purchasing, receiving, and transferring products, or the like. The POS system 102 can store data, such as transactional sales and customer information, IT asset information, and other information. In one embodiment, the transactional information can include information regarding the lane and/or physical position of the POS system 102 within the retail site, the number of transactions processed by the POS system 102, an item count of the number of items in each transaction processed by the POS system 102 (i.e., the basket size), the revenue generated by the total number of transactions processed by the POS system 102, and combinations thereof. If desired or necessary, the POS system 102 can include an accounting interface to pass certain information to one or more in-house or independent accounting applications. For example, in one embodiment, the transactional data can be combined with other information, such as the location of the store and/or information regarding local competitors for reporting purposes, marketing purposes, receivables management, trend analysis, cost analysis, price analysis, profit analysis, or the like. In one embodiment, the POS system 102 can store IT asset information, such as age of the equipment (i.e., years in service), and the frequency and/or extent of IT maintenance calls and/or repairs. In one embodiment, the POS system 102 can operate substantially independently, as a standalone unit.

In addition to tracking historical data, embodiments of POS system 102 can comprise one or more health monitoring mechanisms. Each of the various components of POS system 102 can provide one or more diagnostic alerts comprising the results of self-diagnostic mechanisms, error alerts, or other messages tracking purposes. In embodiments, central computer 104 can execute one or more health checks or other diagnostic tests to determine the status of components of POS system 102. Health data and diagnostic alerts can be combined and/or accumulated with the transactional data or any other data stored by POS system 102.

Figure 2:
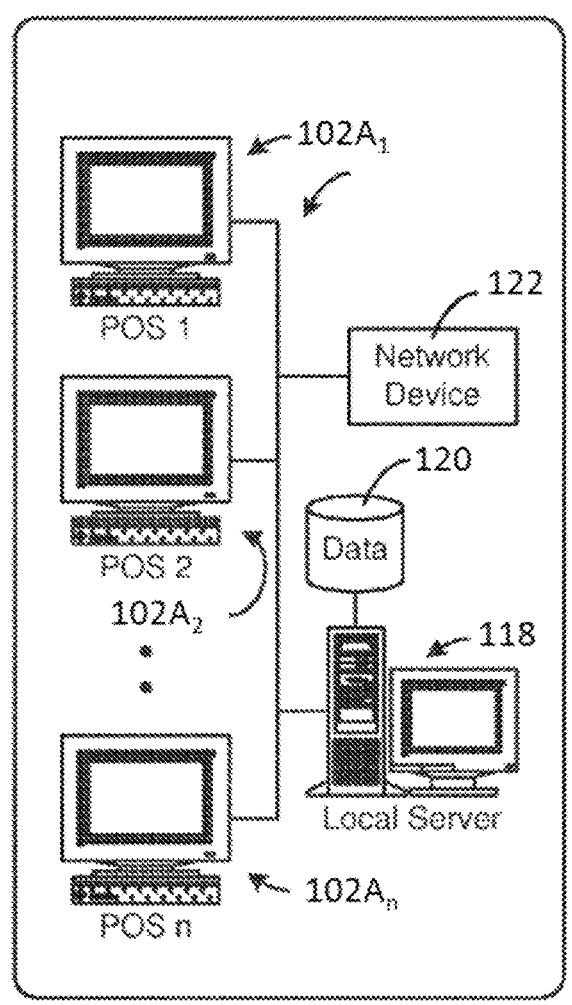
FIG. 2 is a schematic block diagram depicting multiple POS systems operating in the context of a site-wide system in accordance with an embodiment of the disclosure.

Referring to FIG. 2, in one embodiment, each POS system 102 can be one of several POS systems $102A_1$-n forming a front line of a larger system. For example, multiple POS systems $102A_1$-n can operate at a particular retail site 114

(e.g., within a retail, brick-and-mortar store) in such embodiments, the various POS systems $102A_1$-n can be interconnected via a LAN 116 or other wired or wireless network. The LAN 116 can also connect the POS systems 102 to a local server 118.

The local server 118 can support the operation of the associated POS system 102. For example, the server 118 can provide a central repository from which certain data associated with the POS system 102 can be stored, indexed, accessed, or the like. The server 118 can serve certain software to one or more POS system 102. In one embodiment, the POS system 102 can offload certain tasks, computations, verifications, or the like to server 118.

Alternatively, or in addition thereto, the server 118 can support certain back-office functionality. For example, the server 118 can receive and compile (e.g., with one or more associated databases 120) data from the various associated POS systems 102 to provide or support inventory control, purchasing, receiving and transferring products, or the like. The server 118 can also receive and compile transactional sales and customer information, IT asset information, diagnostic data, and other information for reporting purposes, marketing purposes, receivables management, trend analysis, cost analysis, price analysis, profit analysis, or the like.

In one embodiment, and with continued reference to FIG. 2, the one or more POS systems $102A_1$-n and the servers 118 corresponding to a particular retail site 114 can communicate with or access one or more remote computers or resources via one or more network devices 122. For example, the network device 122 can enable the POS system 102 and and/or servers 118 to contact outside resources and verify payment credentials (e.g., credit card information, provided by customer. A network device 122 can comprise a modem, router, or the like.

Figure 3:
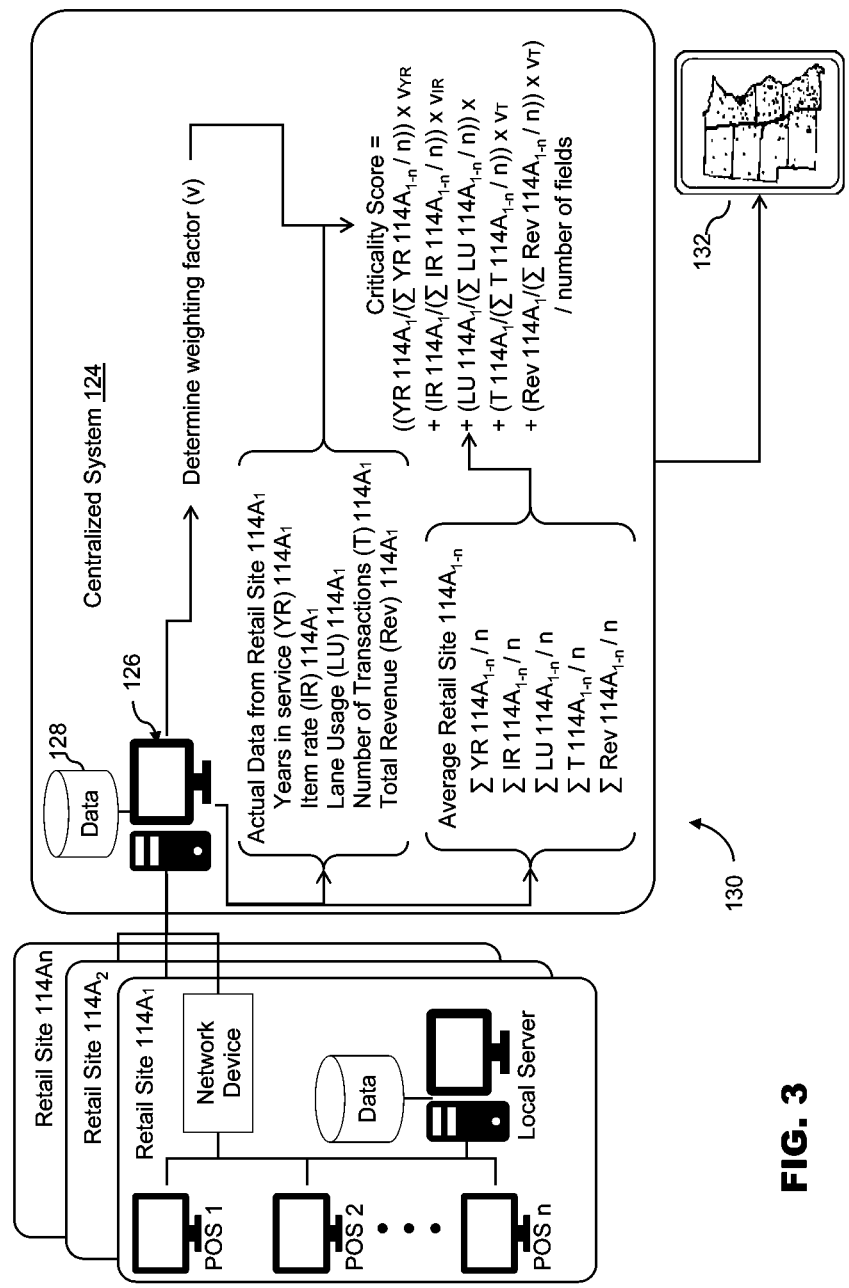
FIG. 3 is a schematic depicting a system configured to assess site-wide IT equipment replacement criticality in accordance with an embodiment of the disclosure.

Referring also to FIG. 3, in one embodiment a POS system 102 (including components as depicted in FIG. 2) can operate within an enterprise-wide system 130 for assessing the IT equipment replacement criticality for multiple retail sites $114A_1$-n (e.g., branches 114 or stores 114). As will be described, system 130 and/or its components or subsystems can include computing devices, microprocessors, modules and other computer or computing devices, which can be any programmable device that accepts digital data as input, is configured to process the input according to instructions or algorithms, and provides results as outputs. In an embodiment, computing and other such devices discussed herein can be, comprise, contain or be coupled to a central processing unit (CPU) configured to carry out the instructions of a computer program. Computing and other such devices discussed herein are therefore configured to perform basic arithmetical, logical, and input/output operations.

Computing and other devices discussed herein can include memory. Memory can comprise volatile or non-volatile memory as required by the coupled computing device or processor to not only provide space to execute the instructions or algorithms, but to provide the space to store the instructions themselves. In embodiments, volatile memory can include random access memory (RAM), dynamic random access memory (DRAM), or static random access memory (SRAM), for example. In embodiments, non-volatile memory can include read-only memory, flash memory, ferroelectric RAM, hard disk, floppy disk, magnetic tape, or optical disc storage, for example. The foregoing lists in no way limit the type of memory that can be used, as these embodiments are given only by way of example and are not intended to limit the scope of the invention.

In embodiments, the system or components thereof can comprise or include various modules or engines, each of which is constructed, programmed, configured, or otherwise adapted, to autonomously carry out a function or set of functions. The term "engine" as used herein is defined as a real-world device, component, or arrangement of components implemented using hardware, such as by an application specific integrated circuit (ASIC) or field-programmable gate array (FPGA), for example, or as a combination of hardware and software, such as by a microprocessor system and a set of program instructions that adapt the engine to implement the particular functionality, which (while being executed) transform the microprocessor system into a special-purpose device. An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques. Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In one embodiment, system 130 can include one or more retail sites $114A_1$, each having one or more POS systems $114A_1$, a local server 118, a local database 120, a network device 122, or combinations thereof. In one embodiment, the multiple retail sites $114A_1$, can report to an associated centralized and/or remote system 124. The centralized system 124 can include a processor 126 and a transaction database 128.

The transaction database 128 can be configured to receive and compile transactional sales and customer information, IT asset information, and other information (collectively POS system data sets) from the servers 118 of the various retail sites $114A_{1-n}$. In embodiments, transaction database 128 can be populated with data extracted from one or more larger enterprise data stores. For example, the servers 118 of the various retail sites $114A_{1-n}$ can be communicatively coupled to an enterprise data store to provide a wide scope of operational data from each site. The enterprise data store can provide one or more interfaces enabling user or programmatic access to selected data, such as the POS system datasets. In embodiments, processor 126 can be configured to populate transaction database 128 on a scheduled basis (for example, nightly or weekly). In other embodiments, processor 126 can be configured to populate transaction database 128 in real-time, near real-time, or on demand.

Each POS system dataset can include one or more fields. In one embodiment, Table 1 is representative of the fields included in the POS system dataset.

TABLE 1

Example POS System Dataset Fields

| Item Rate | Lane Usage | Years in Service | Revenue | Transactions |
|---|---|---|---|---|
| decimal number | dollar amount | decimal number | dollar amount AVE Basket Size AVE Transaction | store type/ category decimal number dollar amount |

In embodiments, the POS system dataset can include the years in service of each POS system 102 and the components therein, the frequency and/or extent of IT maintenance calls and/or repairs of each POS system 102, the frequency and/or extent of alerts or other health messages of each POS system 102, information regarding the physical position of each POS system 102 within the retail site 114, the total number of transactions processed by each POS system 102 (sometimes referred to in the industry as the "number of transactions"), the revenue processed or generated by each POS system 102, the total number of transactions processed by each retail site 114, the total amount of revenue generated by each retail site 114 (sometimes referred to in the industry simply as the "revenue"), an item count of the total number of items in each transaction processed by each POS system 102 (sometimes referred to in the industry as "basket size" or "item rate"), information regarding lane usage within the retail site 114 (which can be a product of the number of transactions and the basket size of each POS system 102), the location of each retail site 114, the size (e.g., square footage) of each retail site 114, the years since or date of "last touch" or last major modification, customer traffic information, store type or category, sales per square foot data, unit number or rate, and/or information about local and regional competitors of each retail site 114. The POS system dataset can further include health monitoring and diagnostic data such as error messages or alerts generated by components of POS system 102.

Figure 4:
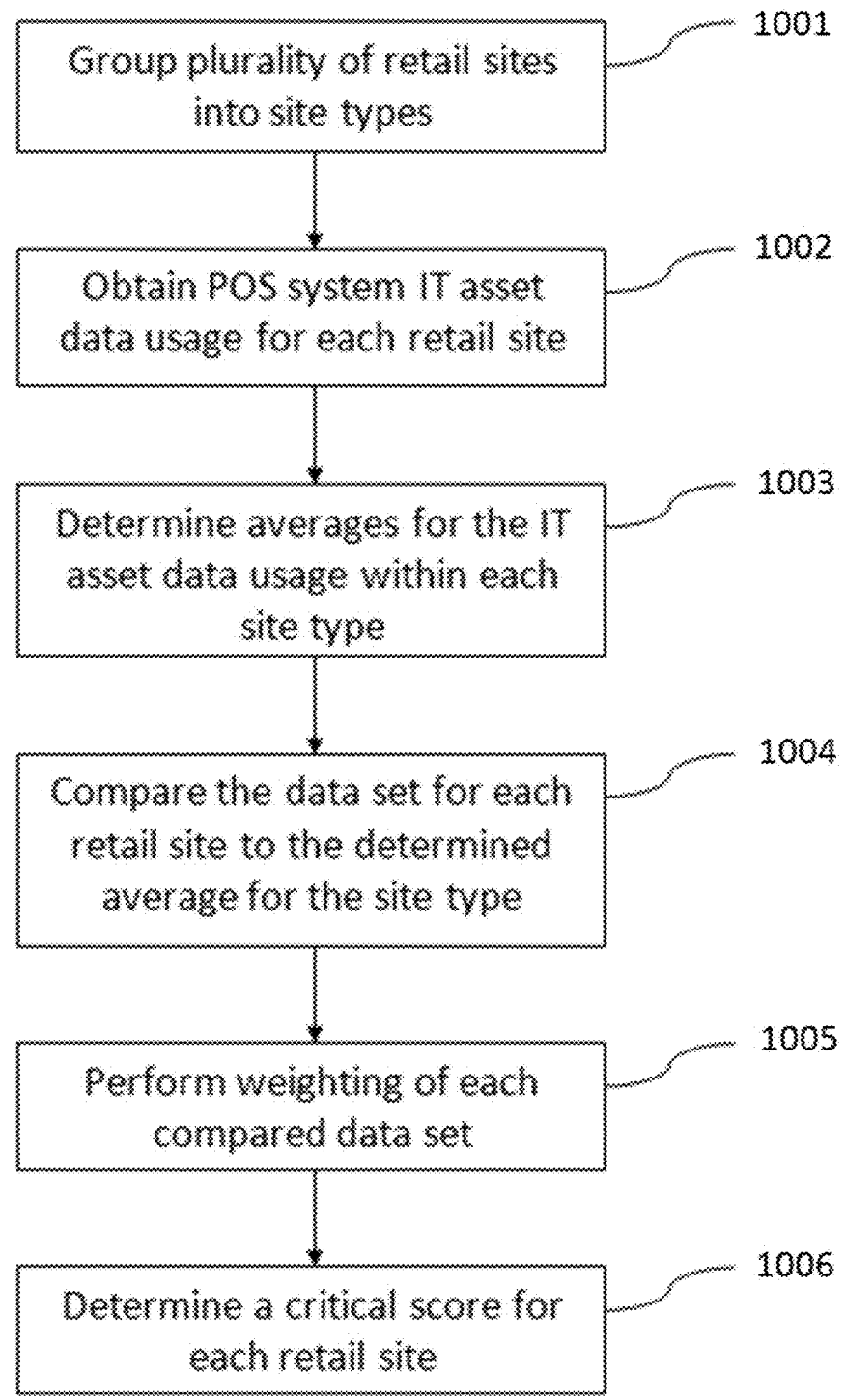
FIG. 4 a block diagram depicting a method of assessing site-wide IT equipment replacement criticality in accordance with an embodiment of the disclosure.

With additional reference to FIG. 4, the processor 126 can include a criticality score processing engine be configured to utilize the data sets stored by the transactional database 128 to generate an IT equipment replacement criticality score for each site $114A_1$-$A_n$. According to the method depicted in FIG. 4, at 1001, the processor 126 can be configured to sort or group the plurality of sites $114A_1$-$A_n$ according to predefined categories or retail site types. For example in one embodiment, the specific retail sites can be grouped into categories, such as, wholesale markets, supercenters, traditional stores, neighborhood markets, and/or distribution centers.

At 1002, the criticality score processing engine can be configured to obtain the POS data sets of each of the various retail sites $114A_{1-n}$. At 1003, the processor 126 can be configured to determine averages for each field within the POS data sets within the predefined groups. For example, for any given retail site type, the processor 126 can compute the average years in service for the POS systems, the average number of IT maintenance calls and/or repairs of the POS systems, the average number of lanes used in the retail sites, the average number of transactions processed by the POS systems, diagnostic information provided by the POS systems, the average amount of revenue generated by each POS system, and the average amount of revenue generated by each retail site.

At 1004, the criticality score processing engine can be configured to compare each field of the POS data for a given retail site 114 to the computed average of that field within the predefined group to which the retail site 114 belongs. For example, the total revenue generated by one specific supercenter $114A_1$ can be compared to the average total revenue generated by supercenters $114A_{1-n}$. In one embodiment, the actual data from retail site $114A_1$ can be divided by the computed averages of the group retail sites $114A_{1-n}$. Division of the actual data by the computed average can produce a ratio or quotient indicating how the specific retail site $114A_1$ compares to the average across retail sites $114A_{1-n}$, wherein a quotient greater than one indicates that the compared field of the actual retail site $114A_1$ exceeds the computed average of that field across the group of retail sites $114A_{1-n}$. This comparison can be done for each field within the data set for each retail site 114.

At 1005, the criticality score processing engine can be configured to associate a weighting value with each field. In one embodiment, the weighting value can represent the relative importance of the field relative to the other fields within the POS data set. For example, in one embodiment, if it is determined that the total number of transactions represents a more accurate indication of the remaining life of the POS system 102 than the years of service of the POS system, a higher weighting value can be assigned to the total number of transactions and basket size processed by the POS system 102 than to the years of service of the POS system 102. In one embodiment, the default weighting value can be one divided by the total number of fields within the POS data set. For example, as depicted in FIG. 3, because the POS data set includes five fields, the default weighting value for each field is equal equally weighted at 20%.

At 1006, the criticality score processing engine can be configured to determine a critical score for each retail site $114A_{1-n}$. The quotient from the comparison of the actual data to the computed average for each field within the dataset can be multiplied by its corresponding weighting factor. The weighted comparisons for each of the fields can then be added together to form a criticality score. In one embodiment, for a given retail site $114A_1$, a criticality score of less than 1.1 indicates that replacement of the IT equipment is of a low priority, a criticality score of between 1.1 and 1.24 indicates that the replacement of the IT equipment is of a medium priority, a criticality score of between 1.25 and 1.39 indicates that the replacement of the IT equipment is of a high priority, and a critical score of above 1.4 indicates that the replacement of the IT equipment is critical (i.e., of the highest priority). In other embodiments, criticality scores can be curved, or other divisions of scores can be used, to determine the relative prioritization (e.g., low, medium, high, critical).

In other embodiments, the described systems and methods can be utilized for more general IT and/or sitewide equipment replacement criticality scores for other electronic devices utilized within the retail environment, not being limited to POS systems 102. For example, in one embodiment, the described systems and methods can be utilized to generate criticality scores for servers, inventory systems, switches, handheld devices, security systems, refrigeration and/or other food preservation equipment, lighting, photocopy equipment, communications equipment, and/or other devices or equipment that may be used in a retail store or other site environment.

These devices and equipment may or may not be components within the POS systems 102 or operate in communication with the POS systems 102. In some embodiments, a known or communicated age of the components or systems of interest can be combined with datasets provided by the POS systems for computation of the criticality score for the components or systems of interest. For example, a sitewide criticality score can be computed as discussed herein in order to identify a relative ranking of sites, or sites in more critical need of IT equipment attention. Within any particular critical site, additional factors or information (e.g., age, years in service, expected useful life, category average, etc.) then can be used or applied to particular systems to determine if or when each system should or will be replaced. In addition, the category of the equipment can be used as a weighting factor in determining criticality scores.

As depicted in FIG. 3, in one embodiment, the criticality scores can be presented to a user via a user interface 132. For example, in one embodiment, criticality scores for the retail sites $114A_{1-n}$ can be represented by a heat map or icons on a map in the form of a report. In one embodiment, the icons can be color-coded according in a stop light configuration, such that a low priority criticality score is colored green, a medium priority criticality score is colored yellow, and high or critically high priority criticality score are colored red. Accordingly, embodiments of the disclosure enable proactive, predictive analysis of potentially large volumes of actual retail environment data in real time to determine IT equipment needs. Those of ordinary skill in the art will appreciate that other user interface elements such as lists, charts, graphs, reports, and the like can also be provided. In one embodiment, user interface 132 can comprise elements enabling a user to view, search, or sort the data in transaction database 128 as needed. For example, in response to a user selection certain equipment type, for example, lighting systems within a given region, user interface 132 can display in a map form, or other view, the locations of retail sites having lighting systems with certain characteristics (such as criticality score).

In embodiments, provide criticality score and other data can be used to schedule maintenance calls. In one embodiment, system 130 can request service at one or more retail sites. In other embodiments, system 130 can provide data to one or more service scheduling systems or users. Requesting service can comprise creating and sending one or more messages including a service request, creating an entry in a service database including the location and type of service required, scheduling a service call based on technician and/or material availability, or the like. In one embodiment a service request can be automatically created for any POS system 102 or retail site 114 having a criticality score above a certain threshold. A service request can also be created automatically in response to certain received alert or other diagnostic messages. Thresholds for service requests can vary based on the retail site, the location, timing, or the like.

Automatically created service requests can reduce costs and increase the reliability of systems at retail sites 114. For example, by dispatching a service technician to repair, replace, or upgrade a component of POS system 102 prior to total failure, downtime can be avoided. In addition, by determining a criticality score based on granular actual use data, unnecessarily early service on components can be avoided. For example each retail site may have high-use and low-use POS systems 102. Without granular criticality data, a retailer may choose to repair or replace all POS systems 102 in order to avoid costly downtime. The criticality data can enable a service technician to repair or replace only those POS systems 102 having a higher criticality score. This can additionally benefit a retailer where full refreshes of retail equipment can be extremely costly, requiring a large investment of labor and capital, while normal service calls can be relatively low cost. In these situations, it can be especially beneficial to request a number of additional smaller service calls in order to extend the time needed between full refreshes (or mitigate the need for a full refresh altogether).

In embodiments, a service scheduling system can use criticality score, alerts, or other data to modify the parameters of a previously scheduled service call to include one or more additional work items at a particular retail site. This can enable service technicians to be more efficient where a high priority service call is necessary at a retail site where a number of lower priority service items can also be addressed.

System 130 can further provide data to, or comprise, one or more diagnostic and/or prognostic models, such as machine learning models. Machine learning models can receive current and historical POS system datasets and provide suggested adjustments to weighting values or other parameters used to determine criticality scores based on detected correlations between POS system datasets and actual maintenance tickets or alert messages. Models can also receive data regarding the results of service calls, such as data provided by one or more technicians indicating a subjective or objective view as to whether service was timely and appropriately described versus service that was premature or inaccurately described such that the technician was unprepared to perform the work. Machine learning models can further provide forecasting capabilities based on the criticality score and other data. For example a model can be configured to provide an estimate of the number of POS systems 102 within a region expected to have a high criticality score within the next six months based on detected correlations. Models can further provide inputs into one or more failure mode effects analysis (FMEA) processes to further refine correlations between actual use and possible equipment issues. Other models can be used to determine and refine the true useful life of one or more components enabling adjustment of repair and replacement schedules to more accurately reflect how components function in use.

It should be understood that the individual steps used in the methods of the present teachings may be performed in any order and/or simultaneously, as long as the teaching remains operable. Furthermore, it should be understood that the apparatus and methods of the present teachings can include any number, or all, of the described embodiments, as long as the teaching remains operable.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

The invention claimed is:

1. A system for assessing site-wide equipment replacement criticality comprising:
at each of a plurality of sites, a point-of-sale (POS) system having a years in service number, the POS system configured to accumulate transaction data in a memory, the transaction data comprising an item rate of a number of items in each transaction processed by the POS system, a total number of transactions processed by the POS system, and a site revenue value, the POS system further configured to transmit the transaction data over a network to a central computer system;
a transaction database executing on the central computer system and configured to receive the years in service number and the transaction data from the POS system at each of the plurality of sites;
a processor configured to:
create a diagnostic model comprising:
for each of the plurality of sites, compute a lane usage as a product of the item rate and the total number of transactions and store the computed lane usages as part of the transaction data in the transaction database,
group the plurality of sites into a plurality of site types, wherein each of the plurality of site types is predefined according to at least one site criteria and the grouping sorts similar sites together according to the at least one site criteria,
for each site type, determine a set of averages comprising an average years in service number, an average item rate, an average lane usage, an average total number of transactions, and an average store revenue value from data in the transaction database,
for each site, compare the years in service number and the transaction data from the site with the set of averages for the site type of the site,
for each site, perform a weighting of the result of the comparing, and
for each site, determine a site-based criticality score from the weighting of the result of the comparing;
a service scheduler communicatively coupled with the processor and configured to
create one or more service request records for each site having a site-based criticality score above a threshold, each service request record indicating a maintenance action to be performed on at least one POS system at the site,
and transmit each service request record to a computing device for review by a user; and
a user interface communicatively coupled with the processor and configured to present the site-based criticality score for each site,
wherein the processor is further configured to:
receive data regarding results of performing at least one of the one or more service request records, and
update the diagnostic model based on detected correlations between at least one of the years in service number and the transaction data, and the results.

2. The system of claim 1, wherein the transaction database is further configured to receive information regarding a frequency of past IT maintenance calls for the POS system.

3. The system of claim 1, wherein the transaction database is further configured to receive information regarding an extent of past IT repairs for the POS system.

4. The system of claim 1, wherein the transaction database is further configured to receive information regarding a geographic location of each of the plurality of sites.

5. The system of claim 1, wherein the transaction database is further configured to receive information regarding one or more local competitors for at least one of the plurality of sites.

6. The system of claim 1, wherein the POS system includes at least one of a primary computer, a monitor, an input device, a payment device, an output device, or a combination thereof.

7. The system of claim 6, wherein the POS system further includes at least one of communications equipment and a handheld device.

8. The system of claim 1, wherein at least one of the plurality of sites includes a plurality of POS systems, each POS system having a years in service number and configured to accumulate transaction data.

9. The system of claim 1, wherein the site-based criticality scores are prioritized according to predefined thresholds.

10. The system of claim 1, wherein the site-based criticality scores are presented as color-coded icons on a geographical map.

11. A method of assessing site-wide equipment replacement criticality comprising:
creating a diagnostic model comprising:
grouping a plurality of retail sites into a plurality of site types, wherein each of the plurality of site types is predefined according to at least one site criteria and the grouping sorts similar sites together according to the at least one site criteria;
for each of the plurality of retail sites:
storing, in the memory of a point-of-sale (POS) system, a years in service number and transaction data, the transaction data comprising an item rate of a number of items in each transaction processed by the POS system, a total number of transactions processed by the POS system, and a site revenue value, transmitting over a network coupling the POS system to a central computer system, the years in service number and the transaction data, and computing a lane usage as a product of the item rate and the total number of transactions and including the computed lane usage with the transaction data;

for each site type, determining a set of averages comprising an average years in service number, an average item rate, an average lane usage, an average total number of transactions, and an average site revenue value;

comparing the years in service number and the transaction data from each site with the set of averages for the site type of the site;

performing a weighting of the result of the comparing;

determining a site-based criticality score for each site from the weighting of the result of the comparing;

creating one or more service request records for each site having a site-based criticality score above a threshold, each service request record indicating a maintenance action to be performed on at least one POS system at the site; and transmitting each service request record to a computing device for review by a user;

receiving data regarding results of performing at least one of the one or more service request records; and updating the diagnostic model based on detected correlations between at least one of the years in service number and the transaction data, and the results.

12. The method of claim 11, wherein the retail site types include at least one of wholesale markets, supercenters, traditional retail stores, neighborhood markets, and distribution centers.

13. The method of claim 11, further obtaining information regarding at least one of: an extent of past IT repairs for the POS system, or a frequency of past IT maintenance calls for the POS system.

14. The method of claim 11, further obtaining information regarding a geographic location of each of the plurality of retail sites.

15. The method of claim 11, further obtaining information regarding one or more local competitors for at least one of the plurality of retail sites.

16. The method of claim 11, wherein comparing the years in service number and the transaction data from each site with the set of averages for the site type of the site comprises dividing the years in service number and the transaction data from each site by the set of averages for the site type of the site.

17. The method of claim 11, wherein a weighting value is multiplied by the result of the comparing.

18. The method of claim 11, wherein the site-based criticality scores are prioritized according to predefined thresholds.

19. The method of claim 11, further comprising presenting the site-based criticality score for each site on a user interface.

20. A system for assessing site-wide equipment replacement criticality comprising:

at each of a plurality of sites, a point-of-sale (POS) system having a years in service number and configured to—
 accumulate transaction data in a memory, the transaction data comprising an item rate of a number of items in each transaction processed by the POS system, a total number of transactions processed by the POS system, and a site revenue value,
 accumulate one or more diagnostic alerts indicative of a status of a component of the POS system, and
 transmit the transaction data over a network to a central computer system;

a transaction database executing on the central computer system configured to receive the years in service number and the transaction data, and the one or more diagnostic alerts from the POS system at each of the plurality of sites;

a processor configured to:
 create a diagnostic model comprising:
  for each of the plurality of sites, compute a lane usage as a product of the item rate and the total number of transactions and store the computed lane usages as part of the transaction data in the transaction database,
  group the plurality of sites into a plurality of site types, wherein each of the plurality of site types is predefined according to at least one site criteria and the grouping sorts similar sites together according to the at least one site criteria,
  for each site type, determine a set of averages comprising an average years in service number, an average item rate, an average lane usage, an average total number of transactions, an average store revenue value, and an average number of diagnostic alerts from data in the transaction database,
  for each site, compare the years in service number, the transaction data, and the number of diagnostic alerts from the site with the set of averages for the site type of the site,
  for each site, perform a weighting of the result of the comparing, and
  for each site, determine a site-based criticality score from the weighting of the result of the comparing;

a service scheduler communicatively coupled with the processor and configured to—
 create one or more service request records for each site having a site-based criticality score above a threshold, each service request record indicating a maintenance action to be performed on at least one POS system at the site,
 and transmit each service request record to a computing device for review by a user; and a user interface communicatively coupled with the processor and configured to present the site-based criticality score for each site, wherein the processor is further configured to:
 receive data regarding results of performing at least one of the one or more service request records, and
 update the diagnostic model based on detected correlations between at least one of the years in service number and the transaction data, and the results.

* * * * *